(12) United States Patent
Malott et al.

(10) Patent No.: US 7,077,458 B2
(45) Date of Patent: Jul. 18, 2006

(54) AWNING ASSEMBLY AND INTERMEDIATE SUPPORTS

(75) Inventors: Dale G. Malott, Middlebury, IN (US); Michael Hicks, El Paso, TX (US)

(73) Assignee: Dometic Corporation, Elkhart, IN (US)

( * ) Notice: Subject to any disclaimer, the term of this patent is extended or adjusted under 35 U.S.C. 154(b) by 51 days.

(21) Appl. No.: 10/998,507

(22) Filed: Nov. 29, 2004

(65) Prior Publication Data

US 2005/0116502 A1    Jun. 2, 2005

Related U.S. Application Data

(60) Continuation-in-part of application No. 10/838,020, filed on May 3, 2004, now Pat. No. 6,860,544, which is a division of application No. 10/287,128, filed on Nov. 4, 2002, now Pat. No. 6,729,679.

(51) Int. Cl.
*B60R 15/00* (2006.01)
(52) U.S. Cl. .................................. 296/175; 296/171
(58) Field of Classification Search ............. 296/175, 296/171, 165, 26.13; 242/595.1; 135/88.1; 160/67, 255, 257
See application file for complete search history.

(56) References Cited

U.S. PATENT DOCUMENTS

| | | | |
|---|---|---|---|
| 827,483 A | 7/1906 | Voorhees | |
| 1,377,784 A * | 5/1921 | Nodland | ............. 242/595.1 |
| 2,220,311 A | 11/1940 | Anton | |
| 2,326,642 A | 8/1943 | Heiser | |
| 2,890,853 A | 6/1959 | D'Azzo | |
| 2,948,288 A | 8/1960 | Nelson | |
| 3,722,571 A | 3/1973 | Knight et al. | |
| 3,834,400 A | 9/1974 | Sattler | |
| 3,851,848 A | 12/1974 | Wiele | |
| 3,918,511 A | 11/1975 | Upton | |
| 3,980,121 A | 9/1976 | McKee | |
| 4,077,419 A | 3/1978 | Lux | |
| 4,117,876 A | 10/1978 | Bennett | |
| 4,188,964 A | 2/1980 | Greer | |
| 4,211,374 A | 7/1980 | Salvino | |
| 4,269,531 A | 5/1981 | Brolin | |
| 4,634,172 A | 1/1987 | Duda | |
| 4,640,332 A | 2/1987 | Turner | |
| 4,727,897 A * | 3/1988 | Watts | ..................... 160/69 |
| 4,801,119 A * | 1/1989 | Pelletier | ................ 135/88.12 |
| 5,044,416 A | 9/1991 | Murray | |
| 5,171,056 A * | 12/1992 | Faludy et al. | ............ 296/175 |
| 5,174,352 A | 12/1992 | Murray et al. | |

(Continued)

*Primary Examiner*—Kiran B. Patel
(74) *Attorney, Agent, or Firm*—Pearne & Gordon LLP

(57) ABSTRACT

An awning assembly having two ends is adapted to be mounted on a first structure that is extendable from a second structure for rotation about a longitudinal axis of rotation extending between the two ends, the awning assembly having a generally horizontal orientation when in use. An intermediate support for the awning assembly is adapted to be attached to the first structure at a location between the two ends of the awning assembly. The intermediate support includes a curved supporting surface that supports the awning. Alternatively, the intermediate support can include two brackets that are adapted to be spaced apart along the longitudinal axis of rotation of the awning assembly and at least two support rollers mounted at their opposite ends to the brackets so as to provide a supporting surface. The curved supporting surface and supporting rollers can comprise concave supporting surfaces that are generally congruent with the outer surface of the awning assembly.

30 Claims, 4 Drawing Sheets

U.S. PATENT DOCUMENTS

| | | | |
|---|---|---|---|
| 5,280,687 A * | 1/1994 | Boiteau | 296/171 |
| 5,423,506 A * | 6/1995 | Spoon | 296/163 |
| 5,752,536 A * | 5/1998 | Becker | 296/171 |
| 5,860,440 A * | 1/1999 | Murray et al. | 296/175 |
| 6,250,321 B1 * | 6/2001 | Ernst | 296/163 |
| 6,260,909 B1 * | 7/2001 | Crean et al. | 296/163 |
| 6,279,641 B1 * | 8/2001 | Malott | 160/67 |
| RE37,567 E * | 3/2002 | Murray | 296/175 |
| 6,619,726 B1 * | 9/2003 | Jones | 296/171 |
| 6,840,568 B1 * | 1/2005 | Carrillo et al. | 269/171 |
| 6,874,559 B1 * | 4/2005 | Hicks | 160/22 |
| 2002/0092552 A1 * | 7/2002 | Jones | 135/88.1 |

* cited by examiner

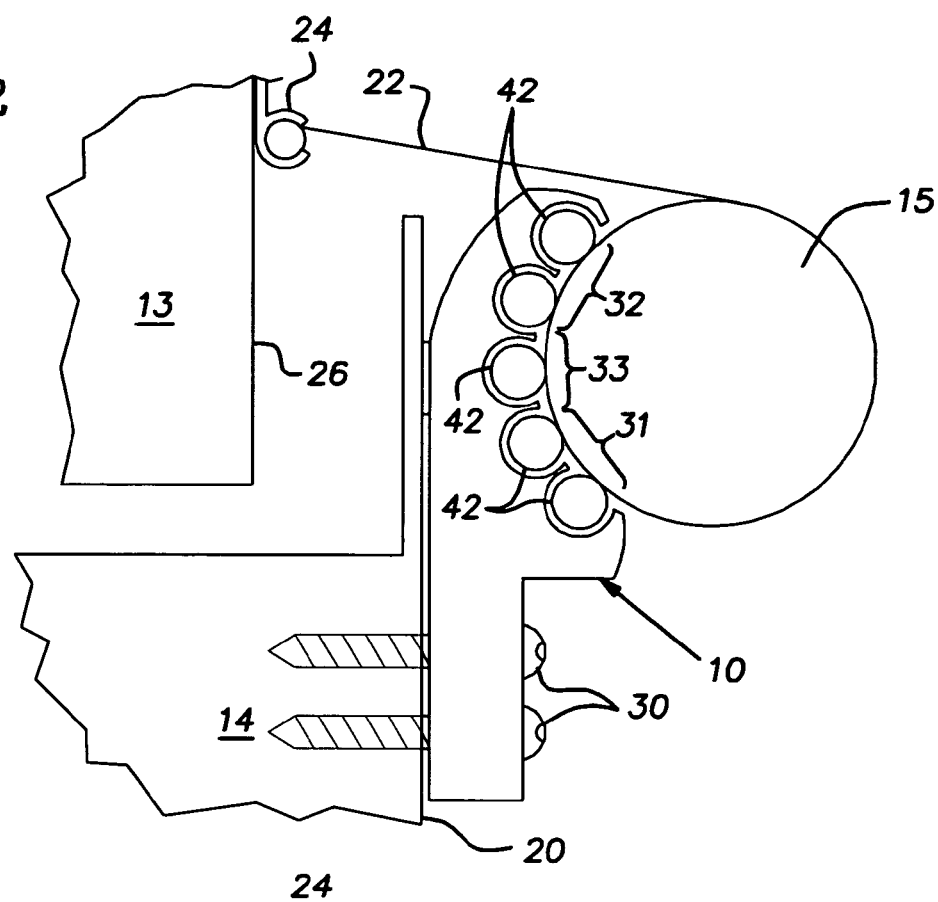
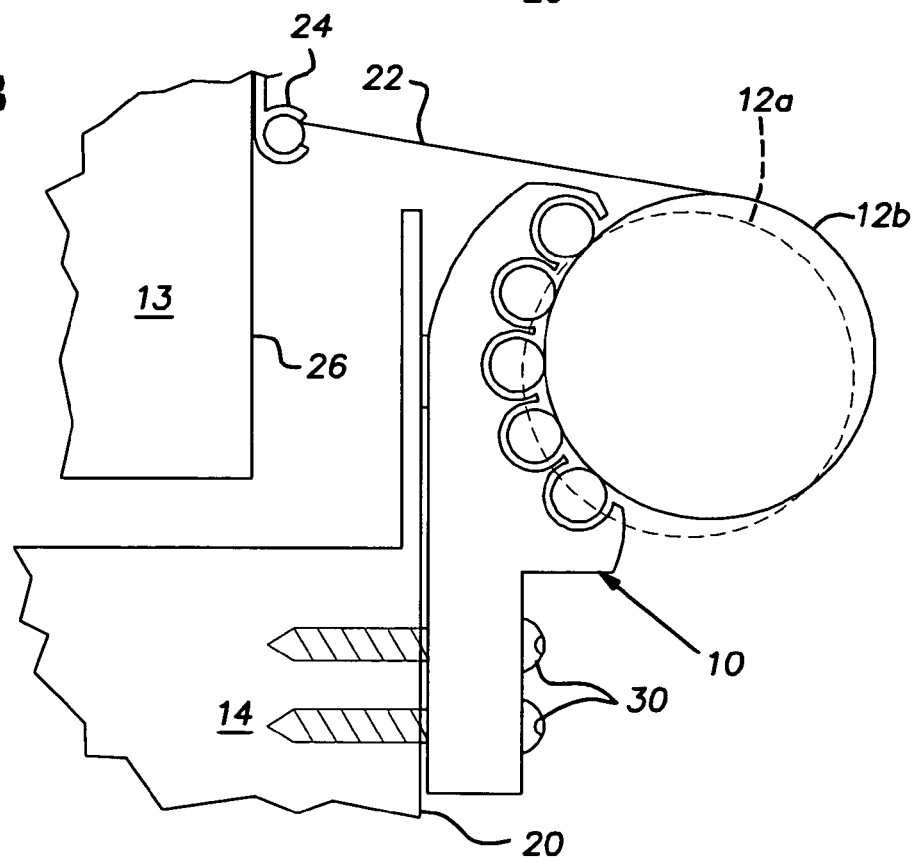

AWNING ASSEMBLY AND INTERMEDIATE SUPPORTS

This application is a Continuation-In-Part and claims the benefit of utility application Ser. No. 10/838,020 filed on May 3, 2004, now U.S. Pat. No. 6,860,544, which is a divisional of Ser. No. 10/287,128, filed Nov. 4, 2002, now U.S Pat. No. 6,729,679 issued May 4, 2004, and is incorporated herein by reference in its entirety.

FIELD OF THE INVENTION

This invention relates generally to awning assemblies that include retractable awnings and, more particularly, to intermediate supports for such awning assemblies.

BACKGROUND OF THE INVENTION

Awning assemblies can be of such a length that they will droop or sag if not supported at least at one location along their length. Examples of such awning assemblies are awning assemblies that are used with vehicles such as recreational vehicles.

Applicable laws restrict vehicles that are transported over roadways to a width of about eight feet. Any vehicle having a greater width usually requires a permit. This restriction limits the interior lay-out of the vehicle, particularly in the case of a recreational vehicle such as a travel trailer and motor home for example. In order to deal with the width restriction, many vehicles are provided with retractable structures that are sometimes referred to as slide-outs or slide-out rooms. The slide-out is contained within the main structure of the vehicle when the vehicle is traversing the roadways and is moved outwardly of the main structure of the vehicle by power actuators when the vehicle is parked. When fully extended, the slide-out affords additional interior space in the vehicle. This concept has found good use with recreational vehicles where the slide-outs can be quite large and extend over nearly the entire length of the main structure of the vehicles. An example of a slide-out is set forth in U.S. Pat. No. 4,500,132.

Customarily, the roof of the slide-out is flat and extends horizontally so as to be generally parallel to the roofs of the main structure of the vehicle. Because of their horizontal nature, the roofs of the slide-outs tend to collect snow, leaves, dirt and other debris. Although seals have been provided at the joint or juncture between the roof of the slide-out and the main structure of the vehicle in an effort to keep the debris from entering the main structure as the slide-out is retracted within the main structure, the seals are not always effective and debris can be carried into the interior of the vehicle.

An alternative method of keeping debris from entering the interior of the vehicle involves the use of an awning assembly that includes a flexible material as an awning. The awning extends from the main structure of the vehicle outwardly over a substantial portion of the roof of the slide-out, thereby covering the junction of the main structure of the vehicle and the slide-out when the slide-out is extended. The awning serves to deflect and/or collect any rain, snow, dirt or other debris that falls on it and that would otherwise come to rest on the roof of the slide-out. The awning assembly is constructed so that, as the slide-out is retracted within the main structure of the vehicle, the awning is wound on a roller mechanism that is rotatably mounted to the slide-out and any debris that has collected on the awning falls to the ground and does not enter the interior of the vehicle through the joint between the slide-out and the main structure of the vehicle. The awning assembly is supported in journals held by brackets secured to the slide-out at both ends of the awning assembly. Such a retractable awning is illustrated and described in U.S. Pat. No. 5,280,687.

Because the awning assemblies are supported only at their ends, the central portion of the assemblies will tend to sag or droop, especially when the awning assemblies are particularly long. Aside from presenting an appearance that is not esthetically pleasing, the sagging of the awning, when the awning is extended from the roller mechanism, restricts the awning's ability to shed water and debris.

SUMMARY OF THE INVENTION

The present invention comprises an awning assembly and an intermediate support for the awning assembly wherein the awning assembly has two ends that are adapted to be mounted on a first structure for rotation about a longitudinal axis of rotation extending between the two ends of the awning assembly, the awning assembly having a generally horizontal orientation when in use. The awning assembly includes a roller mechanism and an awning in the form of a flexible material having a first portion attached to the roller mechanism and a second portion adapted to be attached to a second structure that is extendable from and retractable to the first structure whereby the flexible material is unwound from the roller mechanism when the first structure is extended from the second structure and is wound on the roller mechanism when the first structure is retracted to the second structure. The intermediate support is adapted to be attached to the first structure at a location between the two ends of the awning assembly. The intermediate support includes a curved supporting surface that supports the awning assembly in its generally horizontal orientation. Alternatively, the intermediate support can include two brackets that are adapted to be spaced apart along the longitudinal axis of rotation of the awning assembly and at least two support rollers mounted to the brackets at their opposite ends so as to provide a supporting surface. The curved supporting surface and supporting rollers can comprise concave supporting surfaces that are generally congruent with the outer surface of the awning assembly.

According to one aspect, the invention comprises a vehicle, having a vehicle wall, and a slide-out structure, such as a slide-out room for example, extendable outwardly from the vehicle wall. An awning assembly having two ends is mounted on the slide-out structure for rotation about a longitudinal axis of rotation extending between the two ends of the awning assembly. The awning assembly has a generally horizontal orientation when the vehicle is parked. The awning assembly includes a roller mechanism and an awning in the form of a flexible material that has a first portion attached to the roller mechanism and a second portion that is attached to the vehicle wall whereby the flexible material is unwound from the roller mechanism when the slide-out structure is extended from the vehicle wall and is wound on the roller mechanism when the slide-out structure is retracted to the vehicle wall. An intermediate support is attached to the slide-out structure at a location between the two ends of the awning assembly. The intermediate support includes a curved supporting surface that supports the awning assembly in its generally horizontal orientation.

According to other aspects, the curved supporting surface comprises a friction-reducing arrangement that can comprise polytetrafluoroethylene, or bearings (including roller bearings and ball bearings). Additionally, the curved supporting surface can include a first portion that lies at least partially beneath the awning assembly and a second portion that lies at least partially above the awning assembly when the awning assembly has a generally horizontal orientation. A third portion of the curved supporting surface can be located so as to lie between the awning assembly and the slide-out structure and with the first and second portions define a concave supporting surface that is generally congruent with the outer surface of the awning assembly.

According to another aspect, an intermediate support is provided that includes a first bracket and a second bracket that are attached to the slide-out structure so as to be spaced apart along the longitudinal axis of rotation of the awning assembly. The supporting surface for the awning assembly comprises at least two support rollers. Each support roller has one end rotatably mounted to the first bracket and the other end rotatably mounted to the second bracket so that the support rollers are arranged generally parallel to the longitudinal axis of rotation of the awning assembly. In a particular aspect, first, second and third support rollers are provided and the first, second and third rollers are positioned so as to define a concave supporting surface that is generally congruent with the outer surface of the awning assembly. The first support roller can be located beneath the awning assembly when the awning assembly has a generally horizontal orientation and outwardly of the longitudinal axis of rotation of the awning assembly; the second support roller can be located between the longitudinal axis of rotation of the awning assembly and the slide-out structure and above the longitudinal axis of rotation of the awning assembly when the awning assembly has a generally horizontal orientation; and the third support roller can be located between the longitudinal axis of rotation of the awning assembly and the slide-out structure and beneath the longitudinal axis of rotation of the awning assembly when the awning assembly has a generally horizontal orientation.

According to yet other aspects, the supporting surfaces of the intermediate supports can be adjustable in a vertical direction in relation to the generally horizontal orientation of the awning assembly.

BRIEF DESCRIPTION OF THE DRAWINGS

FIG. 2 is a schematic side view of a first embodiment of an intermediate support for an awning assembly that is mounted on a slide-out room of a vehicle according to the present invention.

FIG. 3 is a schematic side view of the first embodiment of the intermediate support as shown in FIG. 2 that illustrates in broken lines a particular manner in which the awning assembly can be supported by the intermediate support.

DETAILED DESCRIPTION OF THE INVENTION

Figure 1:
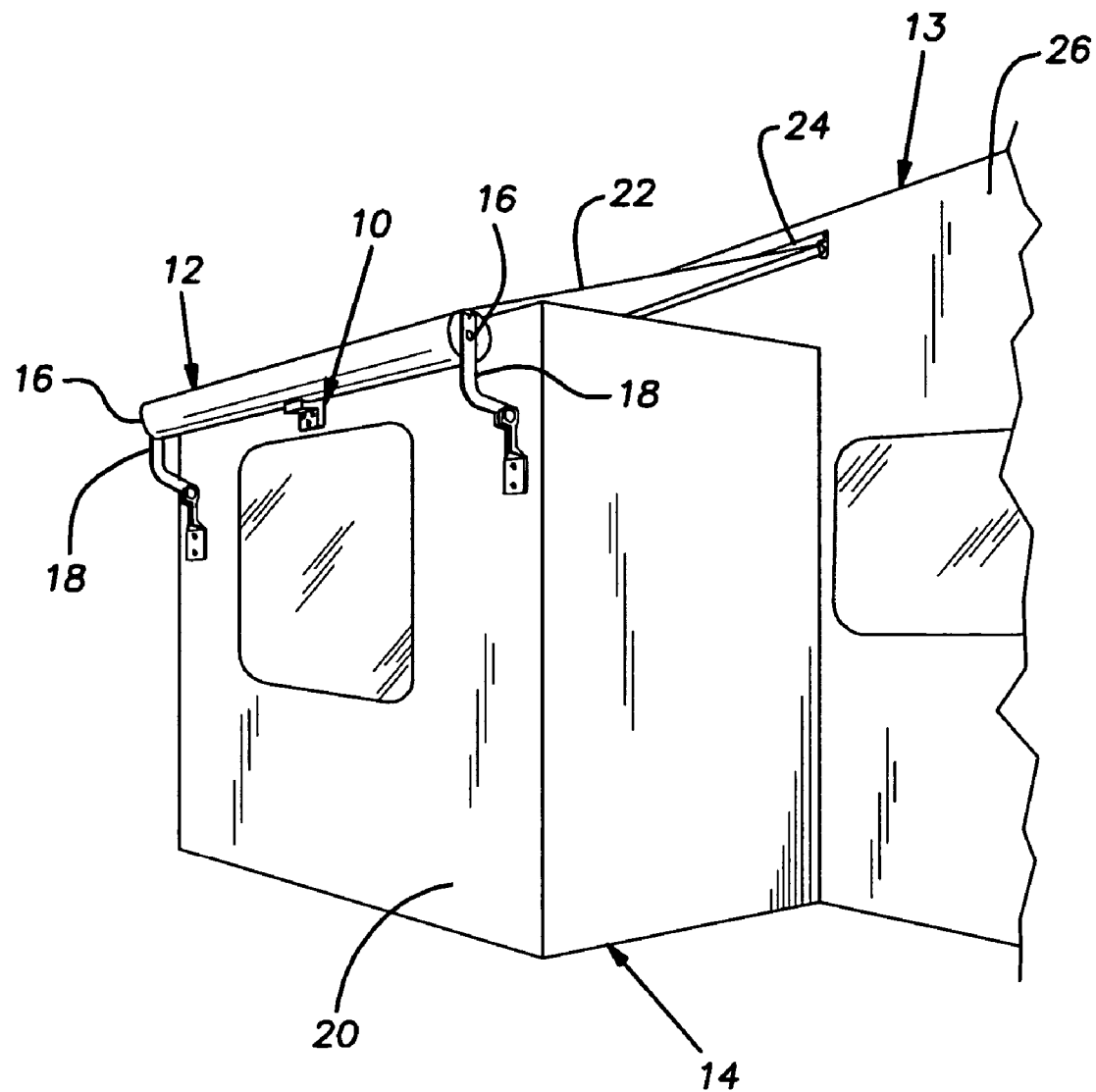
FIG. 1 is a perspective view showing an awning assembly mounted on a slide-out room of a vehicle and provided with an intermediate support according to the present invention.

Referring first to FIG. 1, it can there be seen the manner in which the present invention provides an intermediate support 10 for an awning assembly 12 including an awning 22 of a flexible material. The awning assembly 12 is journaled at its two ends 16 to a pair of brackets 18 that act as end supports for the awning assembly whereby the awning assembly is mounted on the wall 20 of a slide-out room 14 that is extendable outwardly from a vehicle wall 26 of a vehicle 13 for rotation about a longitudinal axis of rotation extending between the two ends 16 of the awning assembly. The awning assembly 10 will have a generally horizontal orientation when the vehicle 13 is parked such as would be the case when the slide-out room 14 is deployed for example.

The brackets 18 are attached to the wall 20 of the slide-out room 14, and, as schematically illustrated in FIG. 2, a first portion, or forward edge, of the awning 22 is attached to a roller mechanism 15 that is included in the roller assembly 12. A second portion, or rearward edge, of the awning is attached to the vehicle wall 26 of the vehicle 13 by means of awning rail 24 that is secured to the wall 26 and the awning 22 is wound around the roller mechanism 15. Consequently, as the slide-out 14 is extended from the vehicle 13, the awning 22 is unwound from the roller mechanism 15 with the second portion of the awning remaining secured to the stationary vehicle wall 26 by the awning rail 24. Conversely, when the slide-out 14 is retracted to the vehicle wall 26 and within the vehicle 13, the awning 22 is wound on the roller mechanism 15.

The support 10 is attached to the wall 20 of the slide-out room 14 and supports the awning assembly 12 at a location intermediate the two ends 16 of the awning assembly. The support 10 is secured to the wall 20 by screws 30.

As best seen in FIG. 2, the support 10 has a curved supporting surface that supports the awning assembly 12 in its generally horizontal orientation. In the embodiment illustrated in FIGS. 2 and 3, the curved supporting surface is defined by the outward portion 40 of each of a grouping of bearings 42 that facilitate the rotation of the awning assembly 12 about its longitudinal axis of rotation on the support 10 as the awning is wound and unwound. However, the bearings 42 can be eliminated and a solid surface provided as the curved supporting surface as will be understood by those skilled in the art familiar with the description of the invention herein.

The curved supporting surface defined by the outward portions 40 of the bearings 42 supports the awning assembly 12 between the two ends 16 of the awning assembly 12 at approximately the midpoint of the awning assembly. The curved supporting surface includes a first portion 31 that lies at least partially beneath the longitudinal axis of rotation of the awning assembly 12 when the awning assembly has a generally horizontal orientation and a second portion 32 that lies at least partially above the longitudinal axis of rotation of the awning assembly 12 when the awning assembly has a generally horizontal orientation. The first portion 31 provides vertical support to the awning assembly to keep it from sagging while the second portion 32 provides support in a negative vertical direction to prevent the awning assembly from being lifted or moved upwardly under the tension of the awning 22 being deployed. Additionally, a third portion 33 of the curved supporting surface lies between the awning assembly 12 and the slide out 14 and spaces the awning assembly 12 from the wall 20, thereby providing horizontal support to the awning assembly. The first, second and third portions define a concave supporting surface that is generally congruent with the outer surface of the awning assembly 12 that is in contact with the supporting surface. If desired, the first portion 31 can be extended so as to be entirely beneath roller mechanism 15 and the second portion 32 can be extended so as to be entirely above roller mechanism 15 when the awning assembly has a generally horizontal orientation.

Referring to FIG. 3, a specific manner in which the support 10 can be used to support the awning assembly 12 is illustrated. The support 10 can be positioned to both lift the awning assembly 12 and space it from the wall 20. The position of the middle of the awning assembly along its longitudinal axis of rotation is schematically shown by broken lines 12a as sagging inwardly and downwardly of wall 20 in the absence of the support 10 and in solid lines 12b as appropriately supported by the support 10 so that the awning assembly in the latter instance will be substantially straight along its longitudinal extent. If desired, the support 10 can be positioned on wall 20 so that the awning assembly 12 is caused to bow upwardly and/or outwardly in relation to the wall 20 when the awning is in a retracted condition. Because the diameter of the awning assembly becomes smaller as the awning 22 is unwound from the roller mechanism 15, any initial outward and/or upward bowing imparted to the awning assembly 12 will diminish and sagging of the roller assembly will be avoided notwithstanding the unwinding of the awning 22.

As schematically shown in FIGS. 2 and 3, and as noted above, bearings 42 are provided as a friction-reducing arrangement to reduce the friction on the awning assembly as the awning 22 is wound and unwound on the roller mechanism 15. Although five bearings 42 are shown in FIGS. 2 and 3, any number of bearings can be used. The bearings may comprise ball or roller bearings or any other type of frictional arrangement may be employed. For example, instead of providing bearings, the curved supporting surface can comprise a solid surface that is coated with a friction-reducing material such as polytetrafluoroethylene (PTFE) for the purpose of facilitating the winding and unwinding of the awning 22 on the roller mechanism 15 as the awning assembly engages the intermediate support 10.

Figure 4:
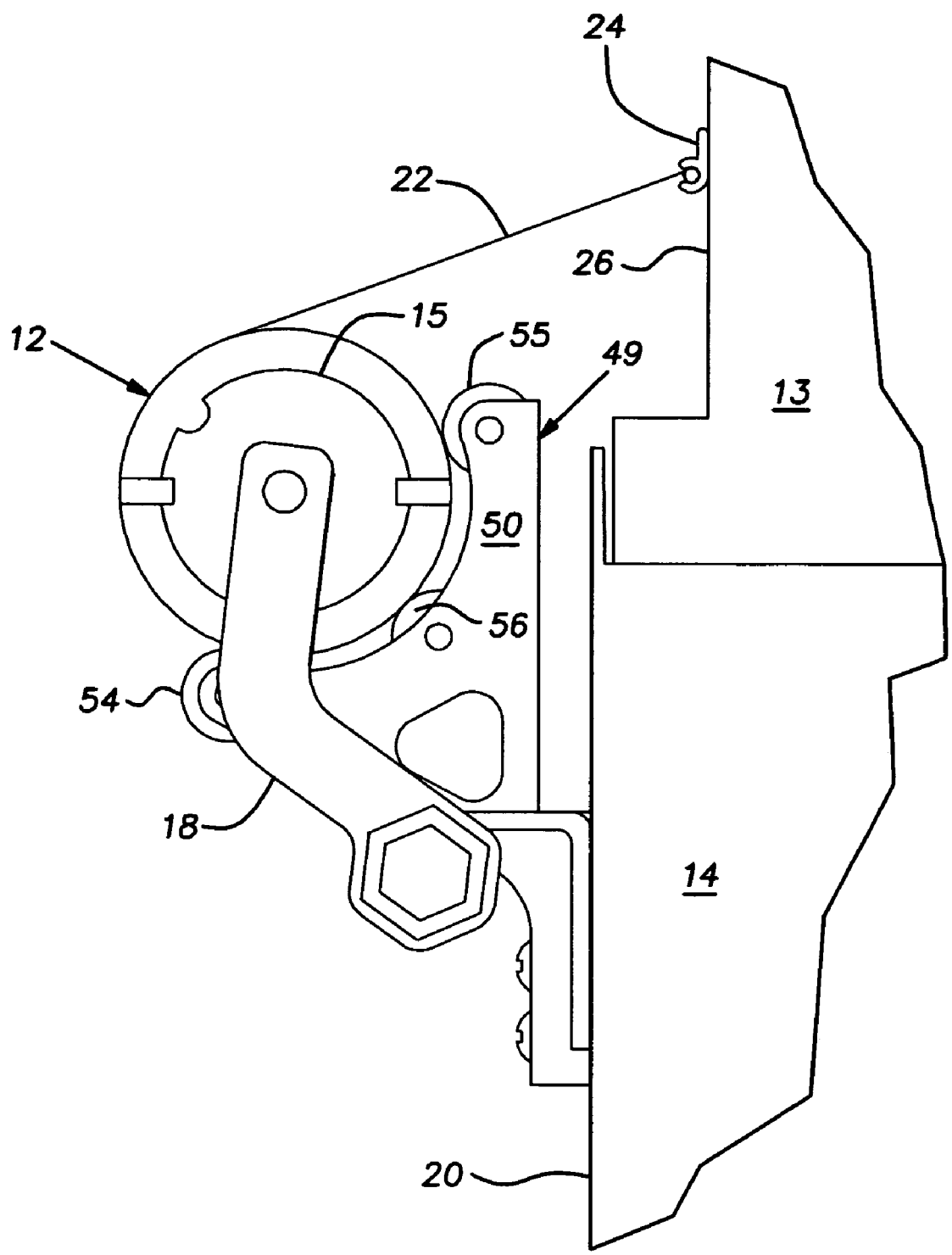
FIG. 4 is a side view of a second embodiment of an intermediate support for an awning assembly that is mounted on a slide-out room of a vehicle according to the present invention.
Figure 5:
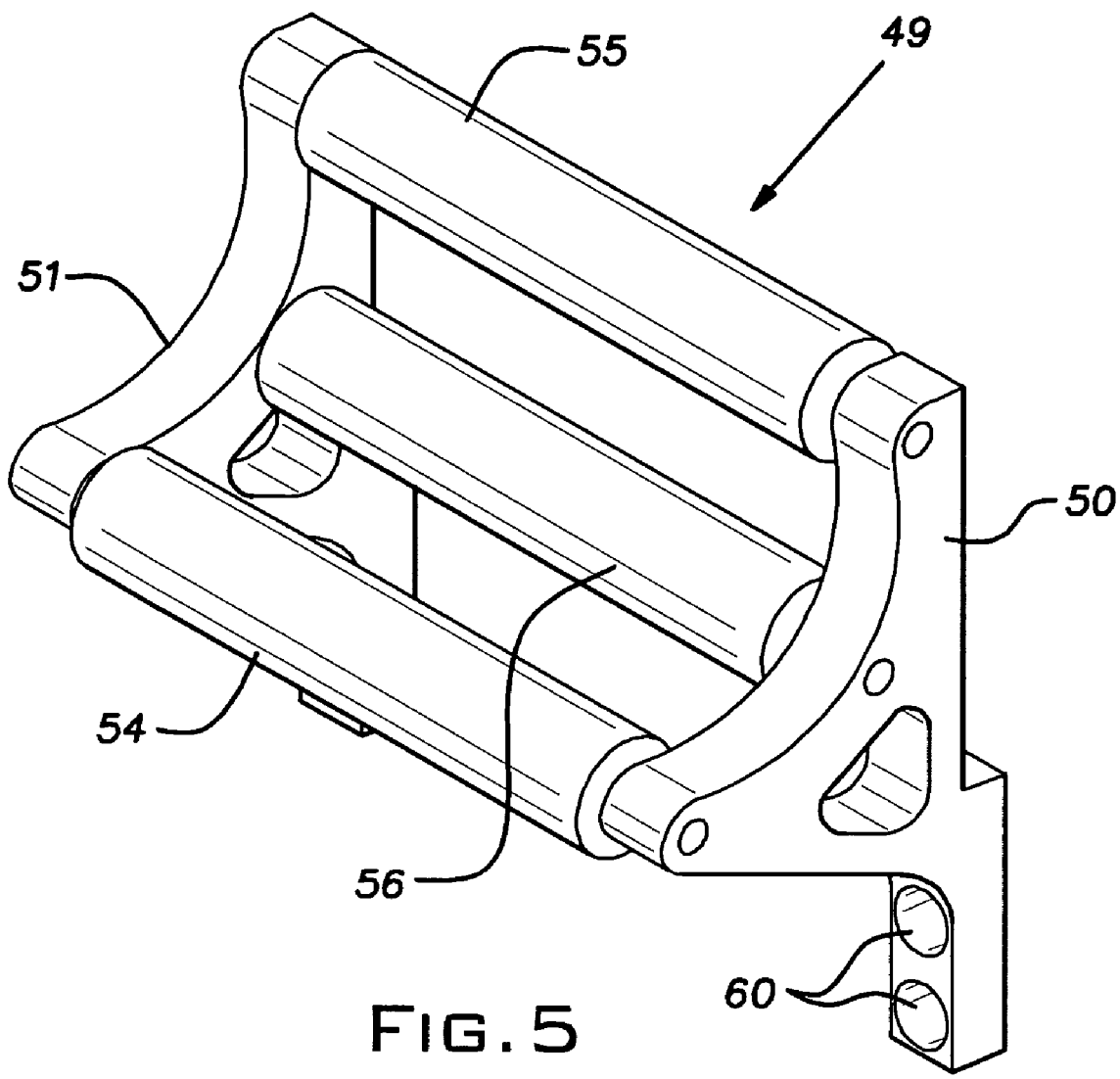
FIG. 5 is a perspective view of the second embodiment of the intermediate support of FIG. 4.

Referring now to FIGS. 4 and 5, a second embodiment of the intermediate support for the awning assembly 12 is illustrated. The second embodiment of the support, indicated generally at 49, includes a first bracket 50 and a second bracket 51. Each bracket is attached to the wall 20 of the slide-out room 14 so as to spaced apart along the longitudinal axis of rotation of the awning assembly 12. The supporting surface for supporting the awning assembly 12 in its generally horizontal orientation is provided by at least two support rollers: a first support roller 54 and a second support roller 55. In the second embodiment shown in FIGS. 4 and 5, three support rollers, including a third support roller 56, are used to provide the supporting surface. Each support roller has one end rotatably mounted to the first bracket 50 and the other end rotatably mounted to the second bracket 51 so that the support rollers are arranged generally parallel to the longitudinal axis of rotation of the awning assembly 12. In the second embodiment of the invention shown in FIGS. 4 and 5, the first support roller 54 is located beneath the longitudinal axis of rotation of the awning assembly when the awning assembly has a generally horizontal orientation. In addition, the first support roller 54, is located outwardly of the longitudinal axis of rotation of the roller assembly 12.

The second support roller 55 is located between the longitudinal axis of rotation of the awning assembly and the wall 20 of the slide-out room 14 . The second support roller 55 is also located above the longitudinal axis of rotation of the awning assembly 12 when the awning assembly has a generally horizontal orientation.

The third support roller 56 is located between the longitudinal axis of rotation of the awning assembly 12 and the wall 20 of the slide-out room 14 and beneath the longitudinal axis of rotation of the awning when the awning assembly when the awning assembly has a generally horizontal orientation. This positioning of the three rollers defines a concave supporting surface that is in contact with the outer surface of the awning assembly as best seen in FIG. 4.

As shown in the drawings the brackets 50 and 51 include apertures 60 so that the brackets may be attached to the wall 20 of the slide-out room 14 by means of screws that pass through the apertures. However, other means of fastening the brackets to the wall 20 of the slide-out can be used. For example, the brackets can be fastened to the wall 20 of the slide-out by riveting, welding or gluing the brackets to the wall. Similarly, the support 10 shown in FIGS. 2 and 3 can be fastened to the wall 20 of the slide-out 14 by other than screws. It can be advantageous to provide a fastening means that allows for vertical adjustment of the intermediate supports of the invention on the wall 20 of the slide-out 14 so that any desired degree of supporting force can be imparted to the awning assembly as discussed in reference to FIG. 3 above. In the two embodiments of the intermediate supports illustrated in the drawings, the supports are fastened to the wall 20 of the slide-out by screws. To allow for vertical adjustment of the supports, the holes in the supports through which the screws pass can be elongated in a vertical direction whereby the supports can be moved upwardly or downwardly as required so that the supports are adjustable in a vertical direction in relation to the generally horizontal orientation of the awning assembly.

Depending on the length and girth of the awning assembly, it may be advantageous to provide more than one intermediate support along the length of the awning assembly. The supports can be spaced apart in any desired manner and any number of supports can be provided.

Although the awning assembly and intermediate supports of the present invention have been described in detail above as applied to a slide-out room 14 of a recreational vehicle, it will be understood by those skilled in the art based on that description that other applications of the awning assembly and intermediate supports can be successfully made. For example, the awning assembly and intermediate supports can be applied to a slide-out for other than a recreational vehicle and the slide-out need not comprise a slide-out room. Further, the awning assembly and intermediate supports can be used in connection with any two structures where a first of the two structures is extendable from and retractable to a second of the two structures. In that case, the awning assembly would be adapted to be mounted on the first structure with a first portion of the awning being attached to the awning assembly roller mechanism and a second portion of the awning being adapted to be attached to the second structure.

It will be understood that the foregoing description is presented by way of example only and that various changes may be made by adding, modifying or eliminating features without departing from the scope of the invention as described above. The present invention, therefore, is not limited to the particular details described above and is inclusive of all structures comprehended by the claims that are set forth below.

What is claimed is:
1. A vehicle comprising:
a vehicle wall:
a slide-out structure extendable outwardly from the vehicle wall;

an awning assembly having two ends, the awning assembly being mounted on the slide-out structure for rotation about a longitudinal axis of rotation extending between the two ends of the awning assembly, and the awning assembly having a generally horizontal orientation when the vehicle is parked;

the awning assembly including a roller mechanism and a flexible material having a first portion attached to the roller mechanism and a second portion attached to the vehicle wall whereby the flexible material is unwound from the roller mechanism when the slide-out structure is extended from the vehicle wall and is wound on the roller mechanism when the slide-out structure is retracted to the vehicle wall; and an intermediate support attached to the slide-out structure at a location between the two ends of the awning assembly, the intermediate support including a curved supporting surface that supports the awning assembly in its generally horizontal orientation.

2. The vehicle of claim 1 wherein the intermediate support is adjustable in a vertical direction in relation to the generally horizontal orientation of the awning assembly.

3. The vehicle of claim 1, wherein the slide-out structure comprises a slide-out room.

4. The vehicle of claim 1, wherein the curved supporting surface includes a first portion that lies at least partially beneath the longitudinal axis of rotation of the awning assembly when the awning assembly has a generally horizontal orientation.

5. The vehicle of claim 4, wherein the curved supporting surface includes a second portion that lies at least partially above the longitudinal axis of rotation of the awning assembly when the awning assembly has a generally horizontal orientation.

6. The vehicle of claim 5, wherein the curved supporting surface includes a third portion that lies between the awning assembly and the slide-out structure, the first, second and third portions defining a concave supporting surface that is generally congruent with the outer surface of the awning assembly.

7. The vehicle of claim 1, wherein the curved supporting surface comprises a friction-reducing arrangement.

8. The vehicle of claim 7, wherein the curved supporting surface includes a first portion that lies at least partially beneath the longitudinal axis of rotation of the awning assembly when the awning assembly has a generally horizontal orientation.

9. The vehicle of claim 8, wherein the curved supporting surface includes a second portion that lies at least partially above the longitudinal axis of rotation of the awning assembly when the awning assembly has a generally horizontal orientation.

10. The vehicle of claim 7, wherein the friction-reducing arrangement comprises PTFE.

11. The vehicle of claim 7, wherein the friction-reducing arrangement comprises bearings.

12. The vehicle of claim 11, wherein the curved supporting surface includes a first portion that lies at least partially beneath the longitudinal axis of rotation of the awning assembly when the awning assembly has a generally horizontal orientation.

13. The vehicle of claim 12, wherein the curved supporting surface includes a second portion that lies at least partially above the longitudinal axis of rotation of the awning assembly when the awning assembly has a generally horizontal orientation.

14. The vehicle of claim 13, wherein the curved supporting surface includes a third portion that lies between the awning assembly and the slide-out structure, the first, second and third portions defining a concave supporting surface that is generally congruent with the outer surface of the awning assembly.

15. The vehicle of claim 11, wherein the friction-reducing arrangement comprises roller bearings.

16. The vehicle of claim 11, wherein the friction-reducing arrangement comprises ball bearings.

17. A vehicle comprising:
a vehicle wall:
a slide-out structure extendable outwardly from the vehicle wall;
an awning assembly having two ends, the awning assembly being mounted on the slide-out structure for rotation about a longitudinal axis of rotation extending between the two ends of the awning assembly, and the awning assembly having a generally horizontal orientation when the vehicle is parked;
the awning assembly including a roller mechanism and a flexible material having a first portion attached to the roller mechanism and a second portion attached to the vehicle wall whereby the flexible material is unwound from the roller mechanism when the slide-out structure is extended from the vehicle wall and is wound on the roller mechanism when the slide-out structure is retracted to the vehicle wall; and
an intermediate support attached to the slide-out structure at a location between the two ends of the awning assembly, the intermediate support including a first bracket and a second bracket that are attached to the slide-out structure so as to be spaced apart along the longitudinal axis of rotation of the awning assembly;
at least two support rollers, each support roller having one end rotatably mounted to the first bracket and the other end rotatably mounted to the second bracket so that the support rollers are arranged generally parallel to the longitudinal axis of rotation of the awning assembly, the at least two support rollers providing a supporting surface that supports the awning assembly in its generally horizontal orientation.

18. The vehicle of claim 17 wherein the slide-out structure is a slide-out room.

19. The vehicle of claim 17 wherein a first support roller is located beneath the awning assembly when the awning assembly has a generally horizontal orientation.

20. The vehicle of claim 19 wherein the first support roller is located outwardly of the longitudinal axis of rotation of the awning assembly.

21. The vehicle of claim 20 wherein a second support roller is located between the longitudinal axis of rotation of the awning assembly and the slide-out structure.

22. The vehicle of claim 21 wherein the second support roller is located above the longitudinal axis of rotation of the awning assembly when the awning assembly has a generally horizontal orientation.

23. The vehicle of claim 22 including a third support roller, the third support roller being located between the longitudinal axis of rotation of the awning assembly and the slide-out structure and beneath the longitudinal axis of rotation of the awning assembly when the awning assembly has a generally horizontal orientation.

24. The vehicle of claim 23 wherein the first, second and third support rollers are positioned so as to define a concave supporting surface that is generally congruent with the outer surface of the awning assembly.

25. The vehicle of claim 24 wherein each of the first bracket and the second bracket is adjustable in a vertical direction in relation to the generally horizontal orientation of the awning assembly.

26. The vehicle of claim 17 wherein the support rollers are positioned so as to define a concave supporting surface that is generally congruent with the outer surface of the awning assembly.

27. An awning assembly and an intermediate support for the awning assembly:
   the awning assembly having two ends and being adapted to be mounted on a first structure for rotation about a longitudinal axis of rotation extending between the two ends of the awning assembly, the awning assembly having a generally horizontal orientation when mounted to the first structure for use;
   the awning assembly including a roller mechanism and a flexible material having a first portion attached to the roller mechanism and a second portion adapted to be attached to a second structure from and to which the first structure is extendable and retractable, respectively, whereby the flexible material is unwound from the roller mechanism when the first structure is extended from the second structure and is wound on the roller mechanism when the first structure is retracted to the second structure;
   the intermediate support being adapted to be attached to the first structure at a location between the two ends of the awning assembly, the intermediate support including a curved supporting surface that supports the awning assembly in its generally horizontal orientation.

28. The awning assembly and intermediate support of claim 27 wherein the supporting surface comprises a friction-reducing arrangement.

29. An awning assembly and an intermediate support for the awning assembly:
   the awning assembly having two ends and being adapted to be mounted on a first structure for rotation about a longitudinal axis of rotation extending between the two ends of the awning assembly, the awning assembly having a generally horizontal orientation when mounted to the first structure for use;
   the awning assembly including a roller mechanism and a flexible material having a first portion attached to the roller mechanism and a second portion adapted to be attached to a second structure from and to which the structure is extendable and retractable, respectively, whereby the flexible material is unwound from the roller mechanism when the first structure is extended from the second structure and is wound on the roller mechanism when the first structure is retracted to the second structure;
   the intermediate support being adapted to be attached to the first structure at a location between the two ends of the awning assembly and including a first bracket and a second bracket that are adapted to be attached to the first structure so as to spaced apart along the longitudinal axis of rotation of the awning assembly;
   at least two support rollers, each support roller having one end rotatably mounted to the first bracket and the other end rotatably mounted to the second bracket so that the support rollers are arranged generally parallel to the longitudinal axis of rotation of the awning assembly, the at least two support rollers providing a supporting surface that supports the awning assembly in its generally horizontal orientation.

30. The awning assembly and intermediate support of claim 29 wherein the at least two support rollers are positioned so as to define a concave supporting surface that is generally congruent with the outer surface of the awning assembly.

* * * * *